United States Patent
Awoniyi-Oteri et al.

(10) Patent No.: US 11,234,176 B2
(45) Date of Patent: Jan. 25, 2022

(54) QUALITY OF SERVICE (QOS) BASED BEAM DETERMINATION FOR MAKE-BEFORE-BREAK (MBB) HANDOVER

(71) Applicant: QUALCOMM Incorporated, San Diego, CA (US)

(72) Inventors: Olufunmilola Omolade Awoniyi-Oteri, San Diego, CA (US); Tao Luo, San Diego, CA (US); Yan Zhou, San Diego, CA (US); Hung Dinh Ly, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/001,473

(22) Filed: Aug. 24, 2020

(65) Prior Publication Data
US 2021/0076279 A1  Mar. 11, 2021

Related U.S. Application Data

(60) Provisional application No. 62/897,913, filed on Sep. 9, 2019.

(51) Int. Cl.
*H04W 4/00* (2018.01)
*H04W 36/08* (2009.01)
(Continued)

(52) U.S. Cl.
CPC ....... *H04W 36/08* (2013.01); *H04W 36/0044* (2013.01); *H04W 36/0061* (2013.01); *H04W 36/18* (2013.01)

(58) Field of Classification Search
CPC . H04W 36/08; H04W 36/18; H04W 36/0044; H04W 36/0061
(Continued)

(56) References Cited

U.S. PATENT DOCUMENTS

2018/0338271 A1* 11/2018 Park ................. H04W 36/0083

FOREIGN PATENT DOCUMENTS

| EP | 3352507 A2 | 7/2018 |
| WO | 2019160342 A1 | 8/2019 |
| WO | 2019161112 A1 | 8/2019 |

OTHER PUBLICATIONS

International Search Report and Written Opinion—PCT/US2020/047793—ISA/EPO—dated Nov. 16, 2020.

* cited by examiner

*Primary Examiner* — Marcos Batista

(74) *Attorney, Agent, or Firm* — Qualcomm Incorporated

(57) ABSTRACT

Certain aspects of the present disclosure provide techniques for beam management for make-before-break (MBB) handover. A method that may be performed by a user equipment (UE) includes establishing a first cell connection with a first base station (BS) while maintaining an existing second cell connection with a second BS, and determining that a first transmission time of a first signal transmitted by the first BS is less than a threshold time duration from a second transmission time of a second signal transmitted by the second BS. In some examples, the first signal is associated with one or more first communication metrics and the second signal is associated with one or more second communication metrics, wherein each of the one or more first communication metrics and the one or more second communication metrics comprise one or more quality of service (QoS) metrics.

30 Claims, 12 Drawing Sheets

(51) Int. Cl.
*H04W 36/18* (2009.01)
*H04W 36/00* (2009.01)

(58) Field of Classification Search
USPC .................................. 455/312, 436; 370/331
See application file for complete search history.

QUALITY OF SERVICE (QOS) BASED BEAM DETERMINATION FOR MAKE-BEFORE-BREAK (MBB) HANDOVER

CROSS-REFERENCE TO RELATED APPLICATION(S)

This application claims benefit of and priority to U.S. Provisional Application No. 62/897,913, filed Sep. 9, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for beam management during a make-before-break (MBB) handover (e.g., a dual active protocol stack (DAPS) handover).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communication techniques that can be utilized by a user equipment (UE) during a make-before-break (MBB) handover, also referred to herein as a dual active protocol stack (DAPS) handover. For example, the techniques described relate to apparatus and methods by which the UE can prioritize one beam of multiple beams transmitted by two different cells, and receive the prioritized beam. For example, the UE may prioritize a first beam over second beam, wherein the first beam is transmitted by a first base station (BS) associated with a first cell, the second beam is transmitted by a second BS associated with a second cell, and while the UE is simultaneously connected to both the first cell and the second cell. Such techniques ensure that the UE is able to receive high priority data despite possible overlapping communications from the two cells.

Certain aspects provide a method for wireless communication. The method generally includes establishing a first cell connection with a first base station (BS) while maintaining an existing second cell connection with a second BS. The method also includes determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics. The method also includes, based on determining that the first transmission time is less than the threshold time duration from the second transmission time, determining which one of the one or more first communication metrics and the one or more second communication metrics has priority over the other. The method also includes, if the one or more first communication metrics have priority over the one or more second communication metrics, receiving the first signal using the first receive beam instead of the second signal using the second receive beam. The method also includes, if the one or more second communication metrics have priority over the one or more first communication metrics, receiving the second signal using the second receive beam instead of the first signal using the first receive beam.

Certain aspects provide for a UE, comprising a memory and a processor communicatively coupled to the memory, wherein the processor is configured to establish a first cell connection with a first base station (BS) while maintaining an existing second cell connection with a second BS. In certain aspects, the processor is further configured to determine that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics. In certain aspects, the processor is further configured to, based on determining that the first transmission time is less than the threshold time duration from the second transmission time, determine which one of the one or more first communication metrics and the one or more second communication metrics has priority over the other. In certain configurations, if the one or more first communication metrics have priority over the one or more second communication metrics, the processor is further configured to receive the first signal using the first receive beam instead of the second signal using the second receive beam. In certain configurations, if the one or more second communication metrics have priority over the one or more first communication metrics, the processor is further configured to receive the second signal using the second receive beam instead of the first signal using the first receive beam.

Certain aspects provide a user equipment (UE). In some examples, the UE includes means for establishing a first cell connection with a first base station (BS) while maintaining an existing second cell connection with a second BS. In some examples, the UE includes means for determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics. In some examples, the UE includes based on a determination that the first transmission time is less than the threshold time duration from the second transmission time: means for determining which one of the one or more first communication metrics and the one or more second communication metrics has priority over the other; if the one or more first communication metrics have priority over the one or more second communication metrics, means for receiving the first signal using the first receive beam instead of the second signal using the second receive beam; and if the one or more second communication metrics have priority over the one or more first communication metrics, means for receiving the second signal using the second receive beam instead of the first signal using the first receive beam.

Certain aspects provide a non-transitory computer-readable storage medium having instructions stored thereon for performing a method of performing a handover operation at a user equipment (UE). In some examples, the method includes establishing a first cell connection with a first base station (BS) while maintaining an existing second cell connection with a second BS. In some examples, the method includes determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics. In some examples, the method includes, based on determining that the first transmission time is less than the threshold time duration from the second transmission time: determining which one of the one or more first communication metrics and the one or more second communication metrics has priority over the other; if the one or more first communication metrics have priority over the one or more second communication metrics, receiving the first signal using the first receive beam instead of the second signal using the second receive beam; and if the one or more second communication metrics have priority over the one or more first communication metrics, receiving the second signal using the second receive beam instead of the first signal using the first receive beam.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for prioritizing a transmit beam of multiple transmit beams transmitted by at least two different cells, and selecting a receive beam for receiving the prioritized transmit beam.

The following description provides examples of receive-beam selection in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
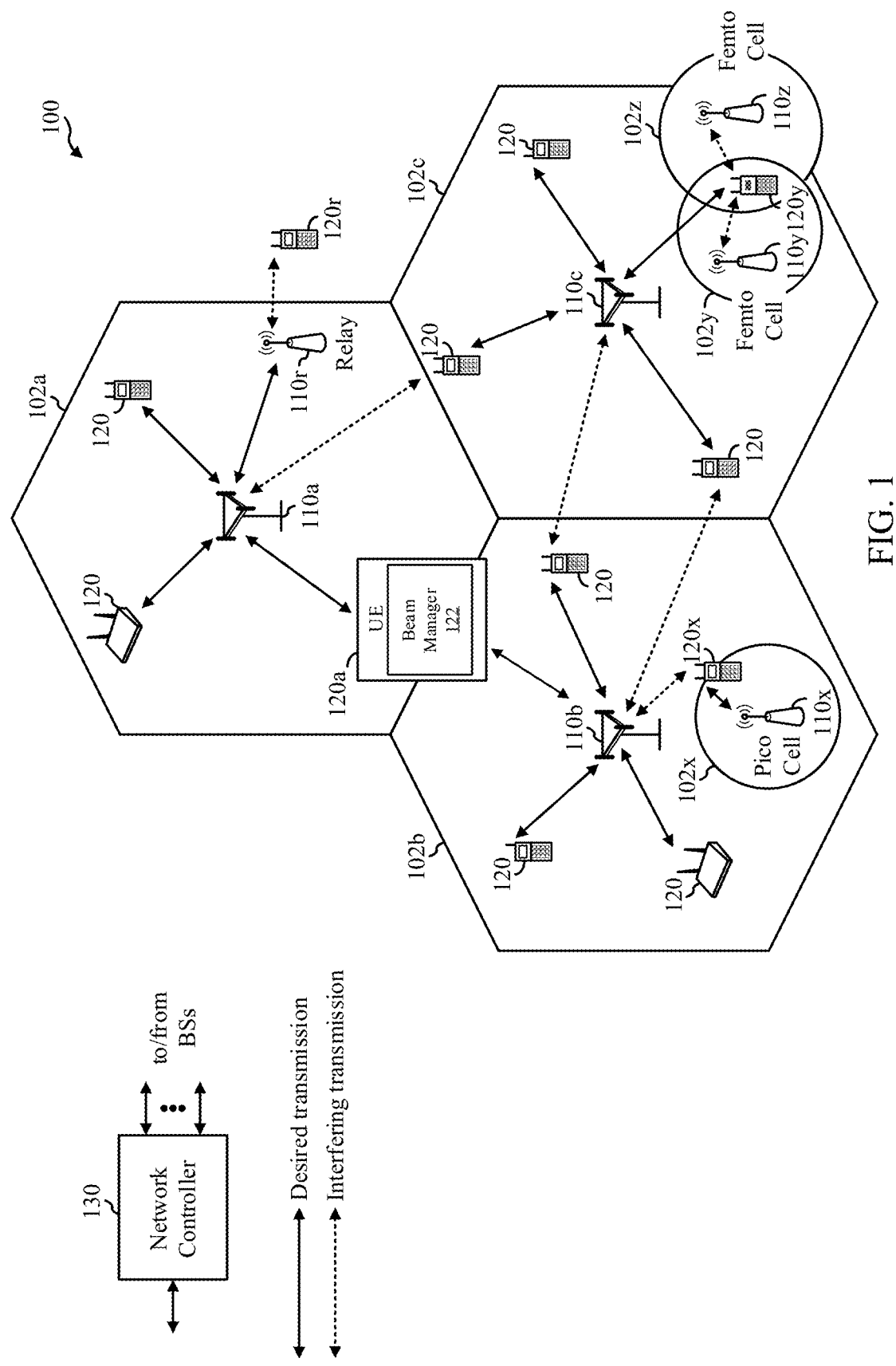
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

In certain aspects, the UE 120a may be configured for determining signaling priority and beam selection based on the priority. For example, the beam manager 122 may be configured to establish a first cell connection with a target base station (e.g., BS 110a) while maintaining an existing second cell connection with a source BS (e.g., BS 110b). The beam manager 122 may also be configured to determine that a first transmission time of a first signal transmitted by the target BS is less than a threshold time duration from a second transmission time of a second signal transmitted by the source BS, wherein the UE 120a is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics.

Based on a determination that the first transmission time is less than the threshold time duration from the second transmission time, the beam manager 122 may be configured to determine which one of the one or more first communication metrics and the one or more second communication metrics has priority over the other. If the one or more first communication metrics have priority over the one or more second communication metrics, the beam manager 122 may be configured to receive the first signal using the first receive beam instead of the second signal using the second receive beam. Alternatively, if the one or more second communication metrics have priority over the one or more first communication metrics, the beam manager 122 may be configured to receive the second signal using the second receive beam instead of the first signal using the first receive beam, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
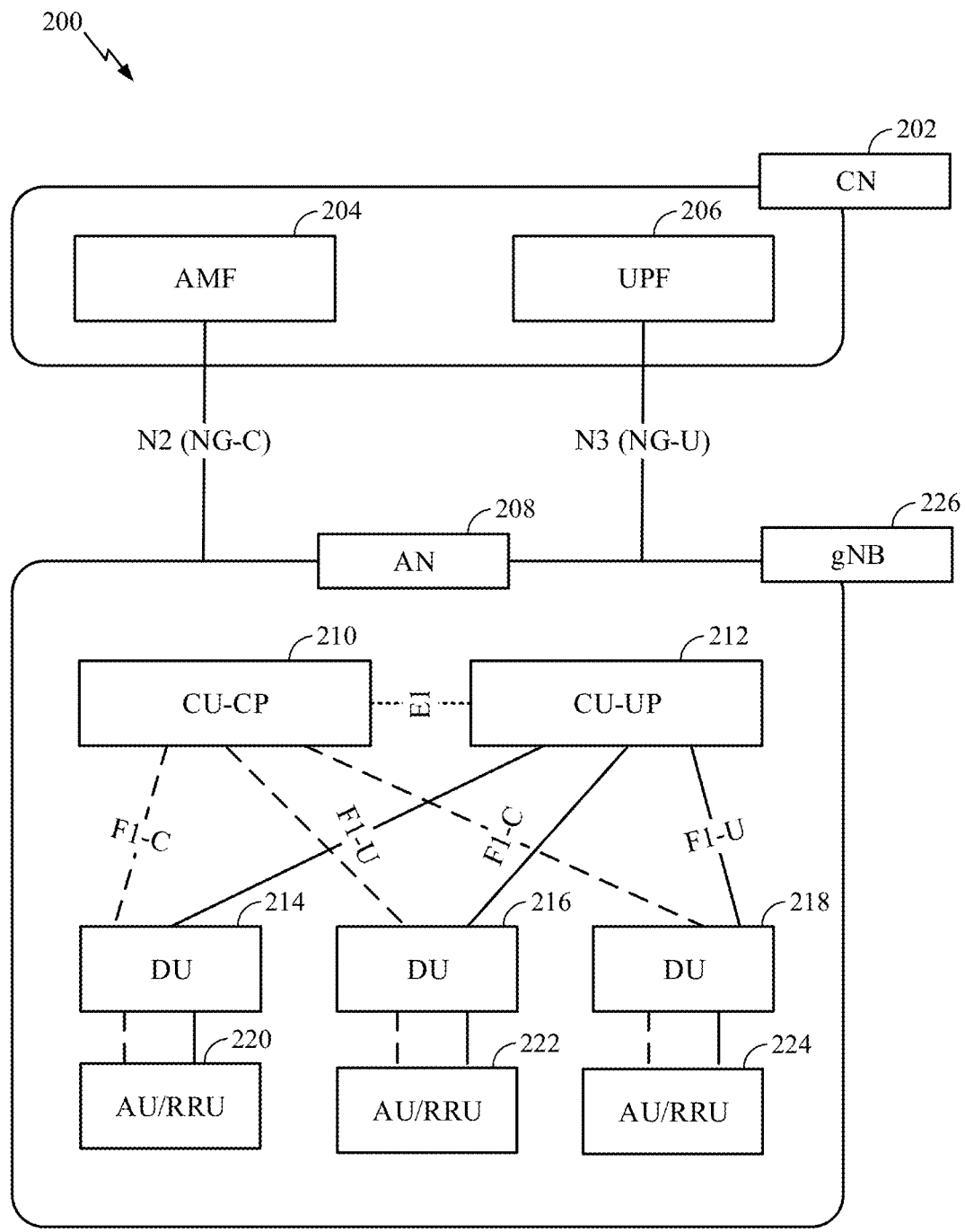
FIG. 2 is a block diagram illustrating an example architecture of a distributed radio access network (RAN), in accordance with certain aspects of the present disclosure.

FIG. 2 illustrates an example architecture of a distributed radio access network (RAN) 200, which may be implemented in the wireless communication network 100 illustrated in FIG. 1. As shown in FIG. 2, the distributed RAN includes core network (CN) 202 and access node (AN) 208.

The CN 202 may host core network functions. CN 202 may be centrally deployed. CN 202 functionality may be offloaded (e.g., to advanced wireless services (AWS)), in an effort to handle peak capacity. The CN 202 may include the access and mobility management function (AMF) 204 and user plane function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support front-hauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common front-haul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
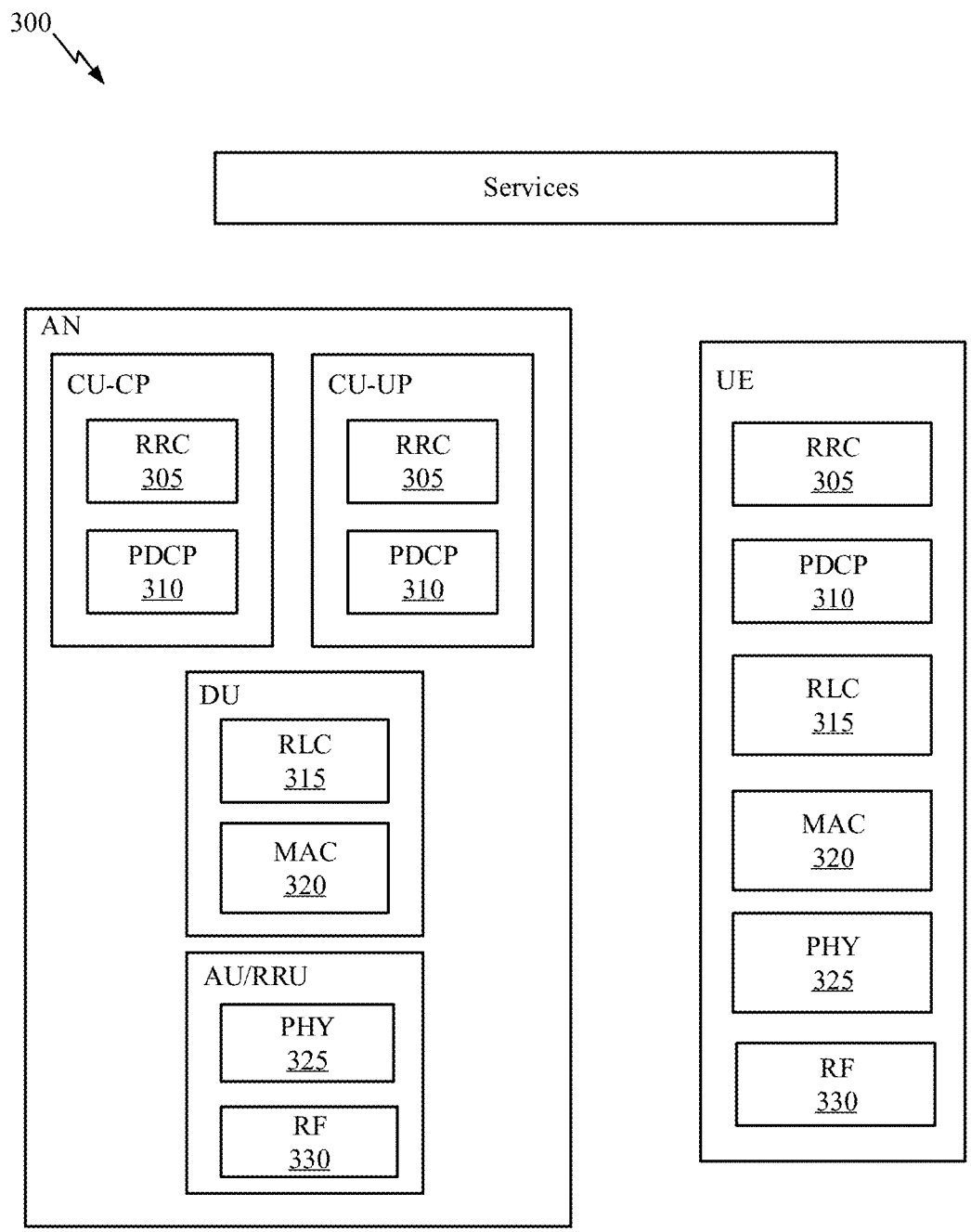
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The radio resource control (RRC) layer 305, packet data convergence protocol (PDCP) layer 310, radio link control (RLC) layer 315, medium access control (MAC) layer 320, physical (PHY) layer 325, and radio frequency (RF) layer 330 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
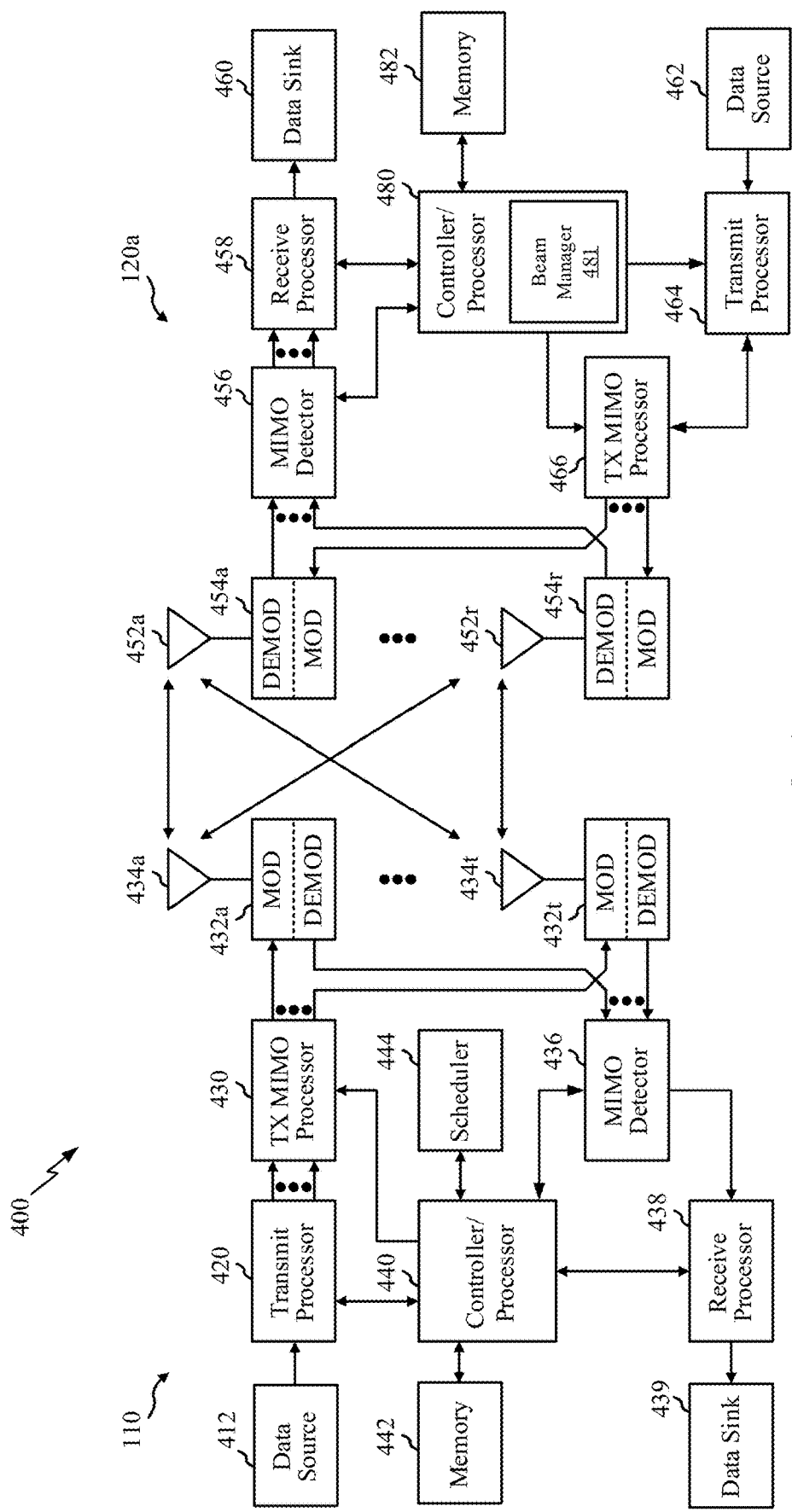
FIG. 4 is a block diagram illustrating example components of a user equipment (UE) and a base station (BS), in accordance with certain aspects of the present disclosure.

FIG. 4 is a block diagram illustrating example components 400 of UE 120*a* and one of BS 110*a* or BS 110*b* (e.g., in the wireless communication network 100 of FIG. 1), which may be used to implement aspects of the present disclosure.

At the BS 110*a*, a transmit processor 420 may receive data from a data source 412 and control information from a controller/processor 440. The control information may be for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The transmit processor 420 may also generate reference symbols, such as for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a*-432*t*. Each modulator 432 may process a respective output symbol stream (e.g., for OFDM, etc.) to obtain an output sample stream. Each modulator may further process (e.g., convert to analog, amplify, filter, and up-convert) the output sample stream to obtain a downlink signal. Downlink signals from modulators 432a-432t may be transmitted via the antennas 434a-434t, respectively.

At the UE 120a, the antennas 452a-452r may receive the downlink signals from the BS 110a and may provide received signals to the demodulators (DEMODs) in transceivers 454a-454r, respectively. Each demodulator 454 may condition (e.g., filter, amplify, down-convert, and digitize) a respective received signal to obtain input samples. Each demodulator may further process the input samples (e.g., for OFDM, etc.) to obtain received symbols. A MIMO detector 456 may obtain received symbols from all the demodulators 454a-454r, perform MIMO detection on the received symbols if applicable, and provide detected symbols. A receive processor 458 may process (e.g., demodulate, de-interleave, and decode) the detected symbols, provide decoded data for the UE 120a to a data sink 460, and provide decoded control information to a controller/processor 480.

On the uplink, at UE 120a, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a-454r (e.g., for SC-FDM, etc.), and transmitted to the BS 110a. At the BS 110a, the uplink signals from the UE 120a may be received by the antennas 434, processed by the modulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The memories 442 and 482 may store data and program codes for BS 110a and UE 120a, respectively. A scheduler 444 may schedule UEs for data transmission on the downlink and/or uplink.

The controller/processor 480 and/or other processors and modules at the UE 120a may perform or direct the execution of processes for the techniques described herein. For example, as shown in FIG. 4, the controller/processor 480 of the UE 120a has beam manager 122 that may be configured for determining signaling priority and beam selection based on the priority. For example, the beam manager 122 may be configured to establish a first cell connection with a target base station (e.g., BS 110a) while maintaining an existing second cell connection with a source BS (e.g., BS 110b). The beam manager 122 may also be configured to determine that a first transmission time of a first signal transmitted by the target BS is less than a threshold time duration from a second transmission time of a second signal transmitted by the source BS, wherein the UE 120a is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics.

Based on a determination that the first transmission time is less than the threshold time duration from the second transmission time, the beam manager 122 may be configured to determine which one of the one or more first communication metrics and the one or more second communication metrics has priority over the other. If the one or more first communication metrics have priority over the one or more second communication metrics, the beam manager 122 may be configured to receive the first signal using the first receive beam instead of the second signal using the second receive beam. Alternatively, if the one or more second communication metrics have priority over the one or more first communication metrics, the beam manager 122 may be configured to receive the second signal using the second receive beam instead of the first signal using the first receive beam, in accordance with aspects of the present disclosure.

Figure 5:
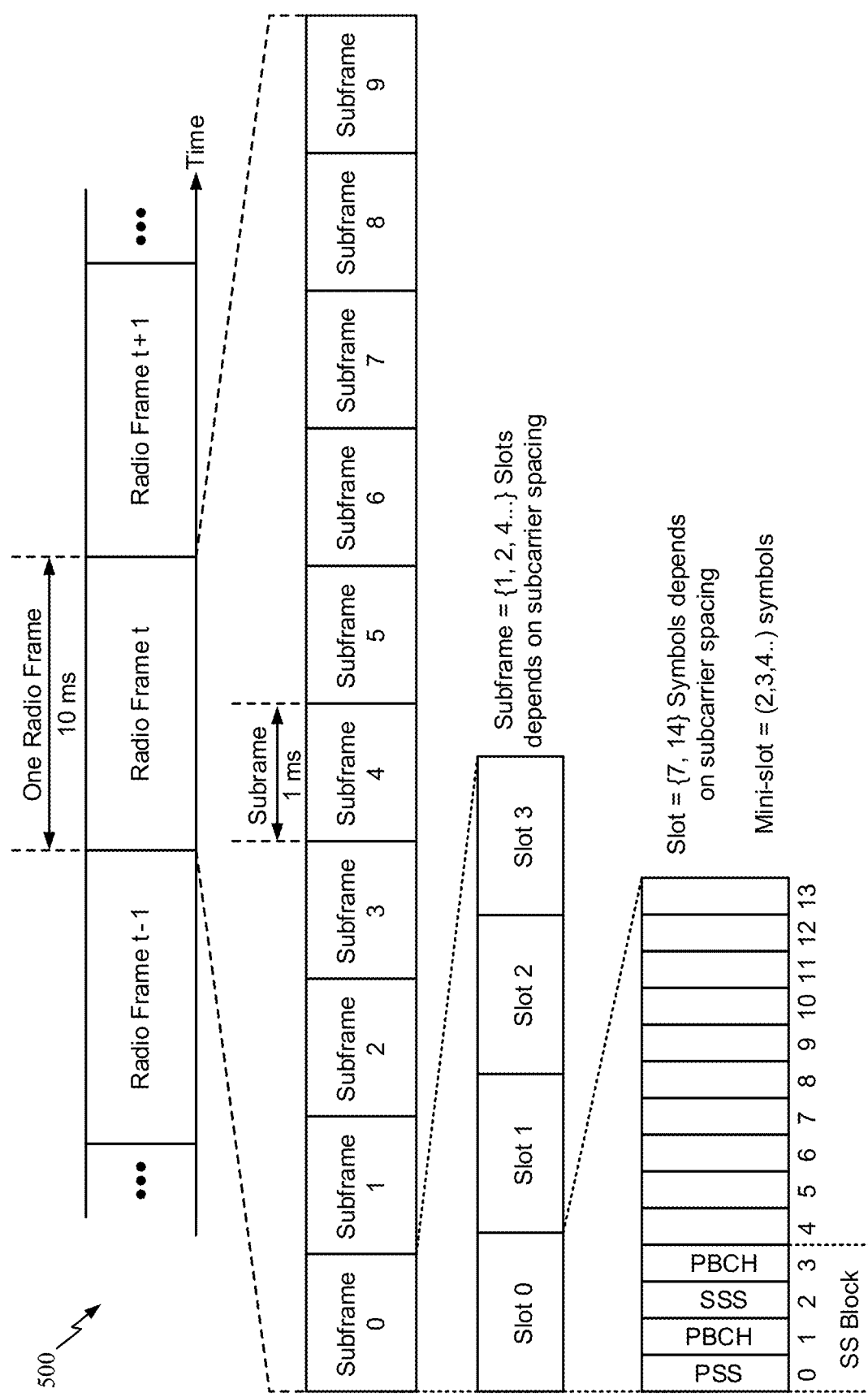
FIG. 5 is a diagram showing an example of a frame format for NR, in accordance with certain aspects of the present disclosure.

FIG. 5 is a diagram showing an example of a frame format 500 for NR. The transmission timeline for each of a downlink and an uplink may be partitioned into units of radio frames. Each radio frame may have a predetermined duration (e.g., 10 milliseconds (ms)) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

In NR, a synchronization signal (SS) block (SSB) is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, and the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

As described in more detail below with reference to FIGS. 6A and 6B, each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Figure 6A:
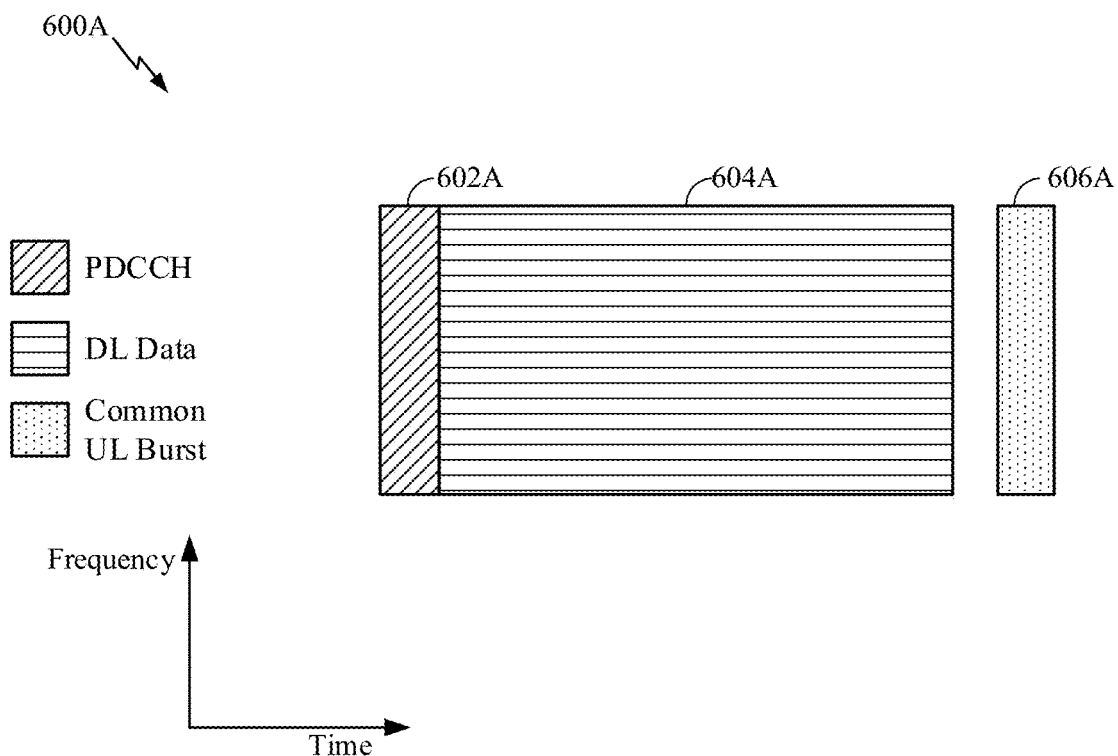
FIGS. 6A and 6B are block diagrams illustrating an example of a DL-centric subframe and an UL-centric subframe, respectively, in accordance with certain aspects of the present disclosure.

FIG. 6A is a diagram 600A showing an example of a DL-centric subframe. The DL-centric subframe may include a control portion 602A. The control portion 602A may exist in the initial or beginning portion of the DL-centric subframe. The control portion 602A may include various scheduling information and/or control information corresponding to various portions of the DL-centric subframe. In some configurations, the control portion 602A may be a physical DL control channel (PDCCH), as indicated in FIG. 6A. The DL-centric subframe may also include a DL data portion 604A. The DL data portion 604A may sometimes be referred to as the payload of the DL-centric subframe. The DL data portion 604A may include the communication resources utilized to communicate DL data from the scheduling entity (e.g., UE or BS) to the subordinate entity (e.g., UE). In some configurations, the DL data portion 604A may be a physical DL shared channel (PDSCH).

The DL-centric subframe may also include a common UL portion 606A. The common UL portion 606A may sometimes be referred to as an UL burst, a common UL burst, and/or various other suitable terms. The common UL portion 606A may include feedback information corresponding to various other portions of the DL-centric subframe. For example, the common UL portion 606A may include feedback information corresponding to the control portion 602A. Non-limiting examples of feedback information may include an acknowledgement (ACK) signal, a negative-acknowledgment (NACK) signal, a HARQ indicator, and/or various other suitable types of information. The common UL portion 606A may include additional or alternative information, such as information pertaining to random access channel (RACH) procedures, scheduling requests (SRs), and various other suitable types of information. As illustrated in FIG. 6A, the end of the DL data portion 604A may be separated in time from the beginning of the common UL portion 606A. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
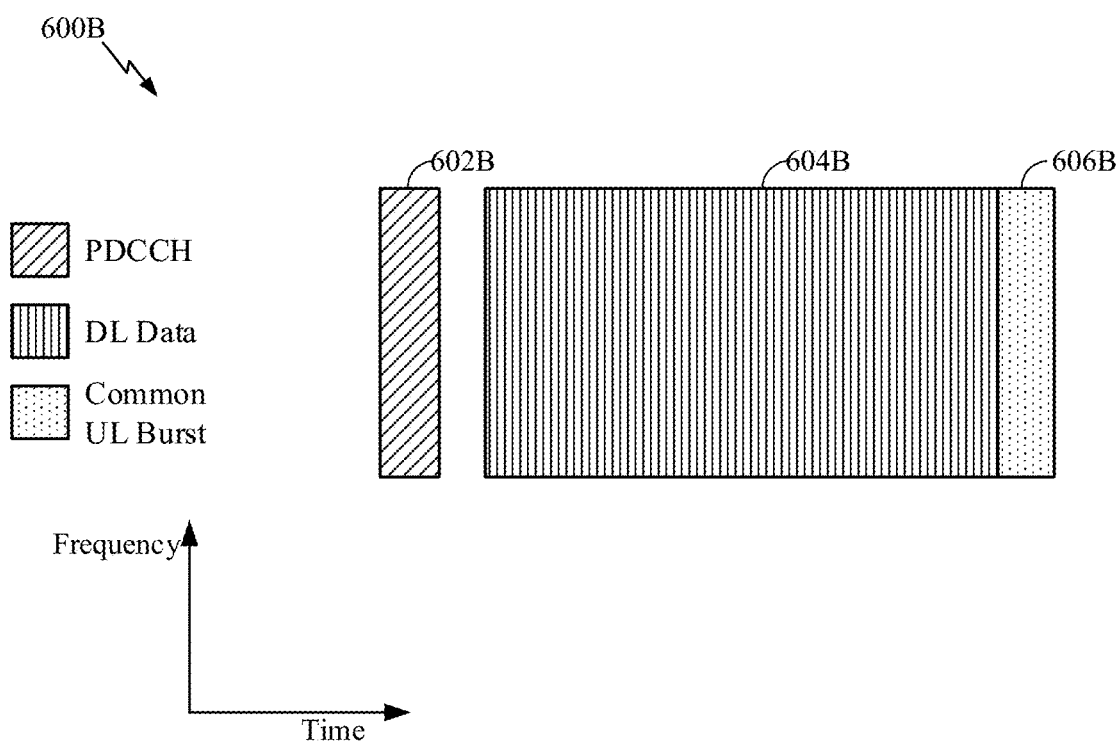

FIG. 6B is a diagram 600B showing an example of an UL-centric subframe. The UL-centric subframe may include a control portion 602B. The control portion 602B may exist in the initial or beginning portion of the UL-centric subframe. The control portion 602B in FIG. 6B may be similar to the control portion 602A described above with reference to FIG. 6A. The UL-centric subframe may also include an UL data portion 604B. The UL data portion 604B may sometimes be referred to as the payload of the UL-centric subframe. The UL portion may refer to the communication resources utilized to communicate UL data from the subordinate entity (e.g., UE) to the scheduling entity (e.g., UE or BS).

As illustrated in FIG. 6B, the end of the control portion 602B may be separated in time from the beginning of the UL data portion 604B. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606B. The common UL portion 606B in FIG. 6B may be similar to the common UL portion 606A described above with reference to FIG. 6A. The common UL portion 606B may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Example Make-Before-Break (MBB) Handover

Figure 7:
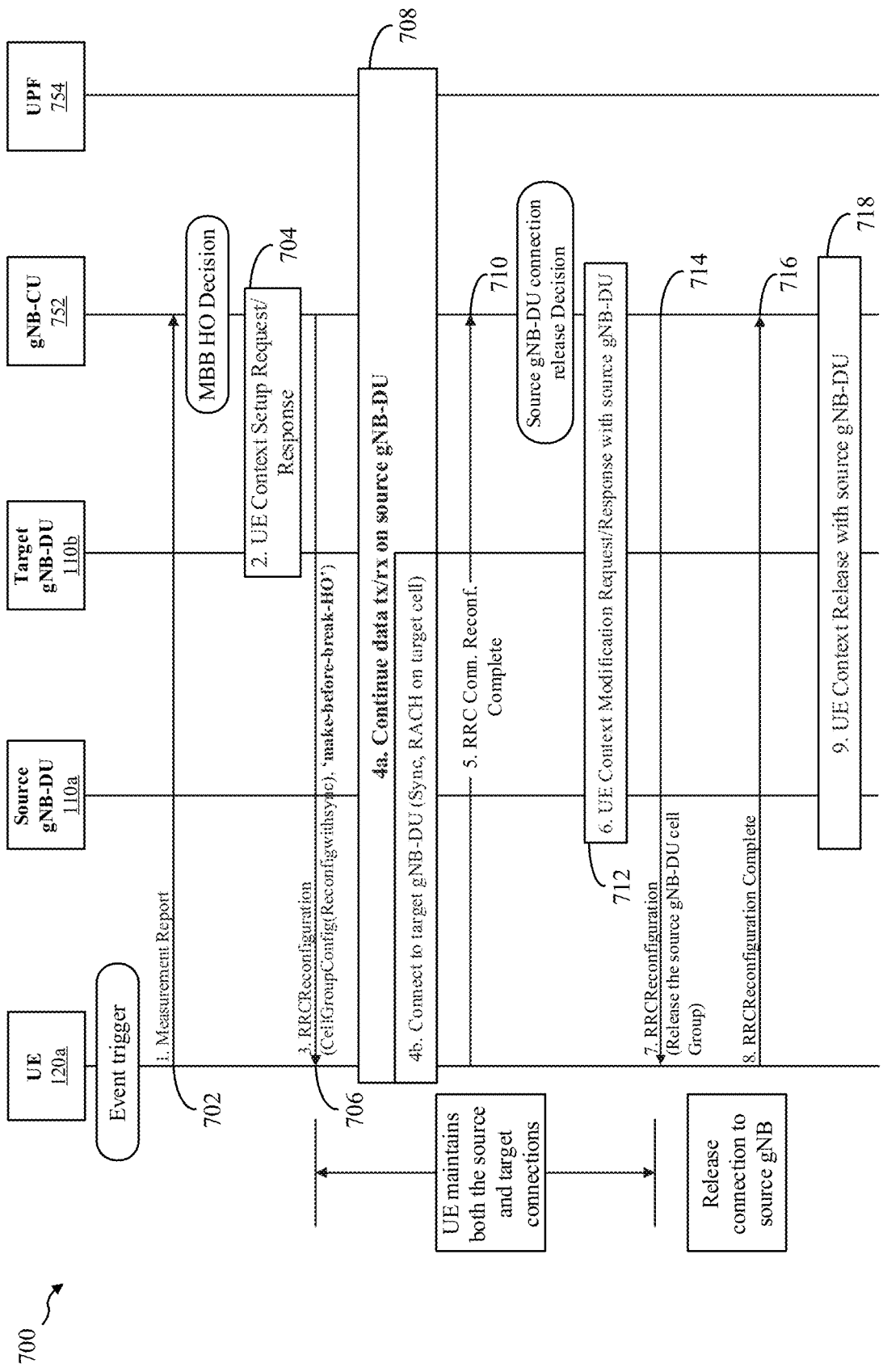
FIG. 7 is a call-flow diagram illustrating an example process for make-before-break (MBB) handover between a UE and at least a source cell, in accordance with certain aspects of the present disclosure.

FIG. 7 is a call-flow diagram 700 illustrating an example process for a make-before-break (MBB) handover (also referred to herein as a dual active protocol stack (DAPS) handover) between a UE 120a and at least a source cell (e.g., such as cell 102a or cell 102b of the wireless communication network 100 of FIG. 1) corresponding to a source gNB (e.g., such as BS 110a or BS 110b of the wireless communication network 100 of FIG. 1), and target cell (e.g., such as the other of cell 102a or cell 102b of the wireless communication network 100 of FIG. 1) corresponding to a target gNB (e.g., such as BS 110a or BS 110b of the wireless communication network 100 of FIG. 1). FIG. 7 also includes a gNB central unit (CU) 752 and a core network (CN) user plane function (UPF) 754.

In certain aspects, at a first step 702, an event trigger may occur at the UE 120a causing the UE 120a to communicate a measurement report with the gNB-CU 752. For example, the measurement report may indicate to the gNB-CU 752 that the UE 120a initiated an MBB handover. Accordingly, gNB-CU can make an MBB handover decision in response to receiving the measurement report. The measurement report may be triggered by a determination by the UE 120a that relative value(s) of one or more criteria (e.g., received power, received quality, path loss, etc.) associated with signaling received from the source gNB 110a are less than a threshold value.

At a second step 704, gNB-CU 752 and target gNB-DU 110b may generate a UE context setup request/response. At a third step 706, the gNB-CU 752 may transmit a radio resource control (RRC) reconfiguration message to the UE 120a. In some examples, the RRC reconfiguration message includes a "make-before-break-HO" indication requesting the UE 120a to perform MBB handover procedures. For example, the RRC Reconfiguration message may include CellGroupConfig (Reconfigwithsync) information. On receiving the RRC reconfiguration message, UE 120a maintains the connection to the source gNB-DU 110a cell even while establishing the connection to the target gNB-DU 110b cell. That is, the UE 120a can transmit and receive data via the source cell during handover.

At a fourth step 708, the UE 120a may continue data transmission and reception with the source gNB-DU 110a. The UE 120a may also connect to the target cell via synchronization and RACH procedures with the gNB-DU 110b. Upon connection with the target gNB-DU, at a fifth step 710, the UE 120a may transmit an "RRC Connection Reconfiguration Complete" message to the gNB-CU 752. Upon reception of the RRC Connection Reconfiguration Complete message, the gNB-CU may determine a release decision.

At a sixth step 712, source gNB-DU 110a, target gNB-DU 110b, and gNB-CU 752 may determine a UE Context Modification Request/Response with the source gNB-DU 110a. At a seventh step 714, the gNB-CU 752 may transmit an RRC Reconfiguration message that releases the source gNB-DU 110a cell. Upon reception of the RRC Reconfiguration message, the UE 120a may release connection to the source gNB.

At an eighth step 716, the UE 120a may transmit a RRC Reconfiguration Complete message to gNB-CU 752. At a ninth step 718, gNB-CU 752 and target gNB-DU 110b determine a UE Context Release with the source gNB-DU 110a.

Example Process for Determining which Signal to Receive During Make-Before-Break (MBB) Handover During a make-before-break (MBB) handover process or a dual active protocol stack (DAPS) handover process, a UE (e.g., UE 120a of the wireless communication network 100 of FIG. 1) may be connected to both a source BS (e.g., such as BS 110a or BS 110b of the wireless communication network 100 of FIG. 1) and a target BS (e.g., such as the other of BS 110a or BS 110b of the wireless communication network 100 of FIG. 1), wherein the source BS is part of a first cell (e.g., such as cell 102a or cell 102b of the wireless communication network 100 of FIG. 1), and the target BS is part of a second cell (e.g., such as the other of cell 102a or cell 102b of the wireless communication network 100 of FIG. 1).

In certain aspects, the UE 120a may establish a first cell connection with the target BS 110b while maintaining the existing second cell connection with the source BS 110a. For example, due to mobility, if the UE 120a determines that path loss between the UE 120a and the source BS 110a has increased to a threshold value, the UE 120a may initiate a handover to the target BS 110b based on measurements of signaling (e.g., broadcast) from the target BS 110b. Thus, once the UE 120a has established a first cell connection with the target BS 110b, and maintained second cell connection with the source BS 110a, the UE 120a may use a first receive beam to receive a first signal from the target BS 110b, and a second receive beam to receive a second signal from the source BS 110a during the MBB handover, wherein the first receive beam is different than the second receive beam.

During the MBB handover, the target BS 110b may transmit a first signal to the UE 120a, and the source BS 110a may transmit a second signal to the UE 120a. However, in some cases, the source BS 110a and the target BS 110b may not communicate with each other to coordinate the timing of signal transmissions from each BS such that the UE 120a may receive both the first signal and the second signal. As such, the first signal and the second signal may be transmitted using the same time resources (overlapping), or transmitted relatively close to each other in terms of time. In one example, if the transmission timing of the first signal is relatively close to the transmission timing of the second signal, the UE 120a may not have enough time to receive the first signal, and then switch from the first cell connection to the second cell connection to receive the second signal. Thus, in some examples, the UE 120a will have to determine which signal to receive.

In certain aspects, the first signal is associated with one or more first communication metrics and the second signal is associated with one or more second communication metrics. For example, each of the one or more first communication metrics and the one or more second communication metrics may include one or more quality of service (QoS) metrics which include one or more of: a QoS class identifier (QCI), a resource type (e.g., guaranteed bit rate (GBR), a delay critical GBR, or non-GBR), a packet delay budget (PDB), a packet error rate (PER), an averaging window, a maximum data burst volume, a reliability requirement, a priority requirement, or a latency requirement.

In some examples, the GBR metric represents a bit rate expected to be provided to the UE 120a in a wireless communication. When a transmission rate of a communication is greater than or equal to the GBR, the QoS metric for that communication is satisfied; however, when the transmission rate of the communication is less than the GBR, the QoS metric of the service is not acceptable.

In some examples, the PDB can represent how a scheduler in the MAC layer (e.g., such as the MAC layer 320 of FIG. 3) handles data to be communicated. For example, data with a higher priority can be expected to be scheduled before data with a lower priority. In some examples, the PER (or bit error rate (BER)) represents a number of erroneous data packets communicated with respect to the total number of data packets communicated. In some examples, the averaging window represents the duration over which a guaranteed flow bit rate (GFBR) shall be calculated (e.g., in the BS, UPF, or UE). In some examples, the maximum data burst volume relates to the largest amount of data that the BS is required to serve.

In some configurations, the first signal or the second signal may include data having a relatively low or ultra-low latency requirement. For example, the latency requirement of data in the first signal may be lower than the latency requirement of data in the second signal. Generally, latency refers to the delay associated with receipt of data at its intended destination. In some configurations, the first signal or the second signal may include data having a relatively high priority requirement. For example, the priority requirement of the first signal may be higher than the priority requirement of second signal. In some examples, the priority level may be determined and provided by network operators (e.g., network providers) based on a subscriber (e.g., user) profile. For example, certain subscribers may be provided with a higher level of priority than other subscribers. In another example, priority level may be associated with certain data (e.g., emergency related messages). Generally, priority refers to the importance or time-sensitivity of the data. Data having relatively higher importance and/or relatively greater time-sensitivity should be received before other data having relatively lesser importance and/or relatively lesser time-sensitivity. In some configurations, the first signal or the second signal may include data having a relatively high reliability requirement. For example, the reliability requirement of the first signal may be greater than the reliability requirement of the second signal. Generally, reliability refers to how consistently data is successfully received by the intended destination without errors.

In some examples, a transmission time of the first signal overlaps a transmission time of the second signal (e.g., the first signal and the second signal are transmitted using the same time resources), or a difference in time between the transmission time of the first signal and the transmission time of the second signal is below a threshold. In such an example, the UE 120a may need to determine a priority associated with each of the first signal and the second signal in order to determine which signal to receive. In some examples, the threshold is a minimum amount of time required by the UE 120a to switch from one receive beam for receiving signaling from one of the source BS 110a or target BS 110b, to a second receive beam for receiving signaling from the other of the source BS 110a or target BS 110b. Based on a comparison of the priority of the first beam with the priority of the second beam, the UE 120a may determine to receive the signal having the highest priority, and may proceed to select a receive beam for receiving the signal having the highest priority, instead of receiving the other signal via another receive beam.

It should be noted that switching from the first cell connection to the second cell connection may include switching from a first transmit beam to a second transmit beam, where the first transmit beam is transmitted by one of the source BS 110a or the target BS 110b, and where the second transmit beam is transmitted by the other of the source BS 110a or the target BS 110b. Switching from the first cell connection to the second cell connection may also include switching from a first set of radio-frequency (RF) parameters associated with the first cell to a second set of RF parameters associated with the second cell. In some examples, the RF parameters include one or more of a bandwidth, a transmit power, a channel frequency, or a center frequency associated with the first cell and the second cell.

Figure 8A:
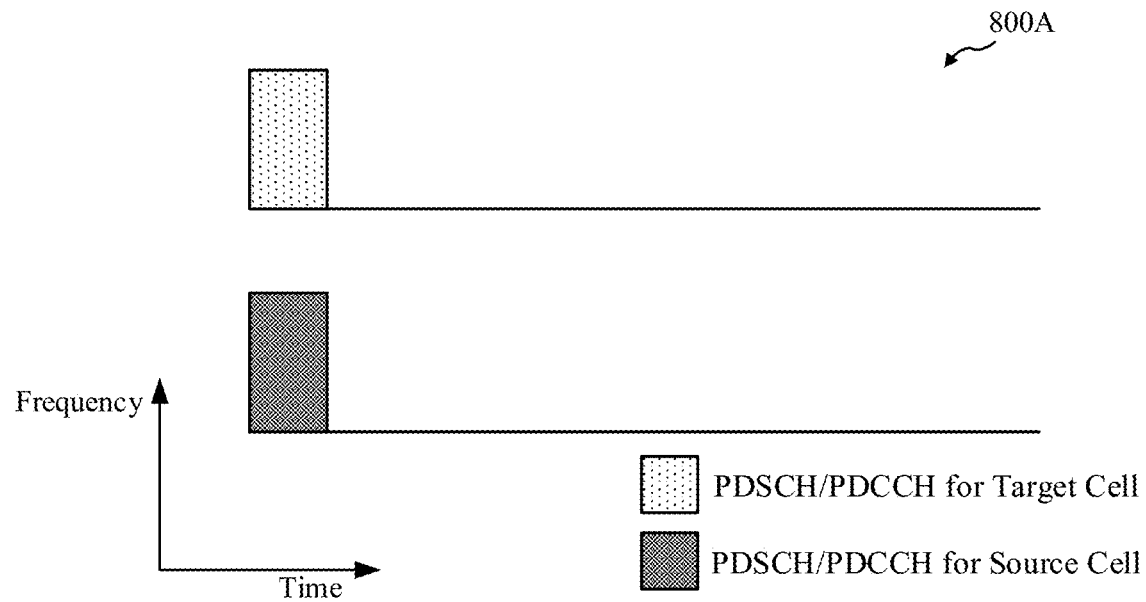
FIGS. 8A-8C are block diagrams illustrating examples of an overlapping scenario and non-overlapping scenarios during MBB handover, in accordance with certain aspects of the present disclosure.
Figure 8B:
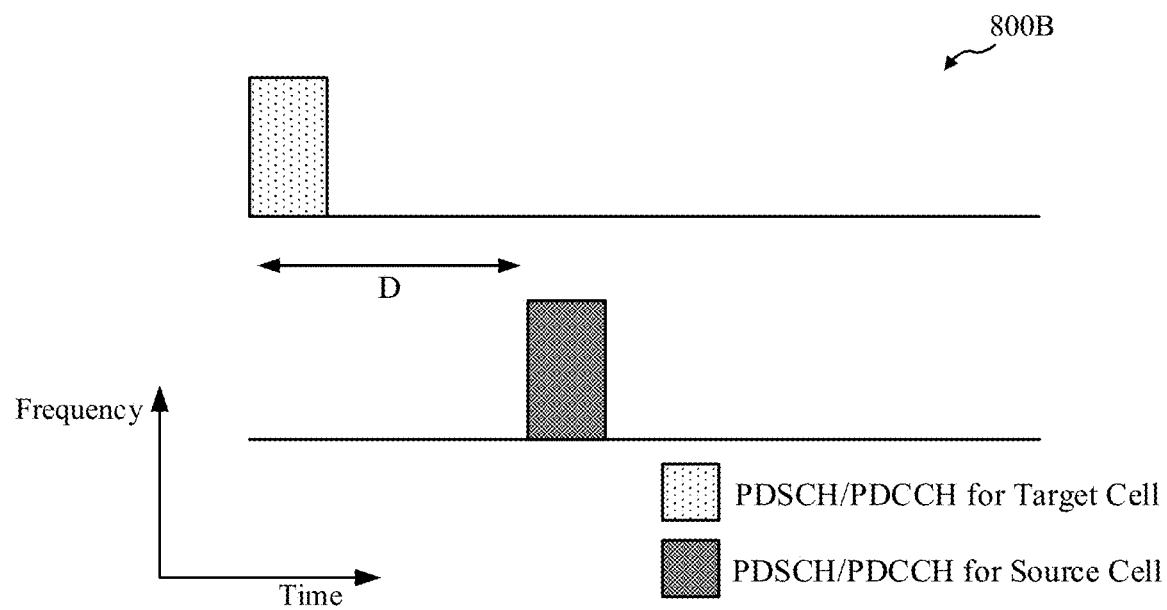
Figure 8C:
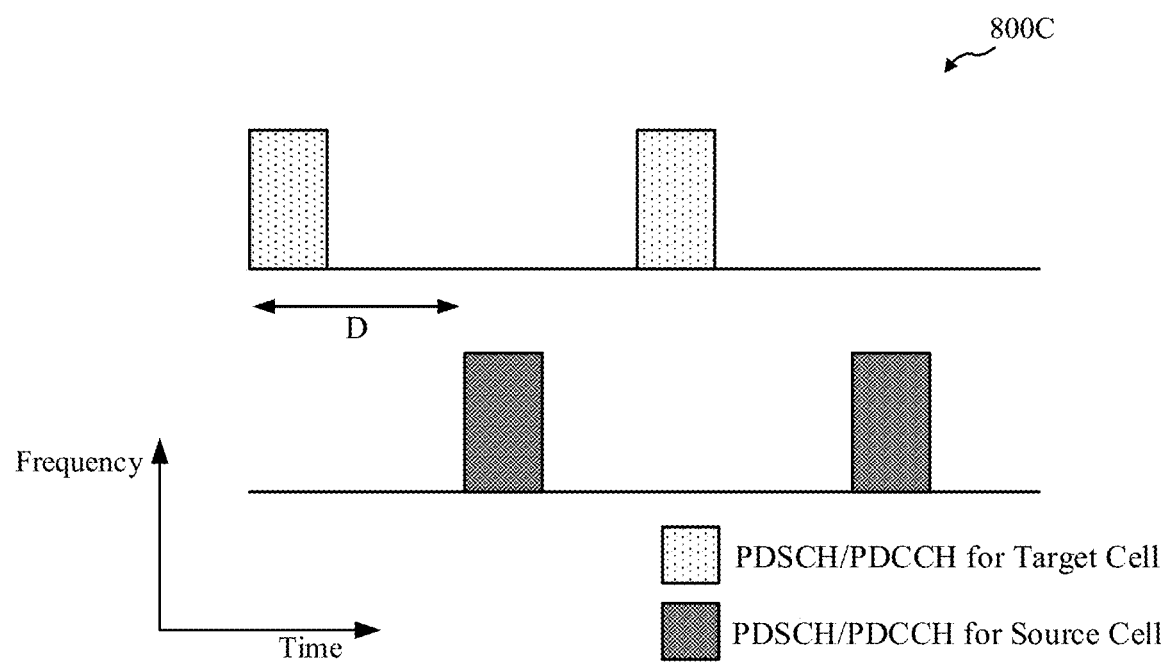

For example, FIGS. 8A, 8B, and 8C are block diagrams (800A, 800B, 800C) illustrating examples of an overlapping scenario and non-overlapping scenarios during MBB handover.

Here, FIG. 8A illustrates an overlapping scenario in which the PDSCH or PDCCH for a target cell (e.g., such as cell 102a or cell 102b of the wireless communication network 100 of FIG. 1) overlaps (e.g., wherein at least a portion of a transmission beam transmitting the first signal may overlap in time with another transmission beam transmitting the second signal) a PDSCH or PDCCH for a source cell (e.g., such as the other of cell 102a or cell 102b of the wireless communication network 100 of FIG. 1).

In certain aspects, for the overlapping scenario, determining which of the first signal or the second signal to receive may be based on which signal has priority over the other. For example, if the priority is based on quality of service (QoS), and assuming that the overlap channels are both PDSCHs but associated with different applications (e.g., enhanced mobile broadband (eMBB) and ultra-reliable low-latency communication (URLLC)), the QoS of the applications may be determined and a higher priority may be given to applications with higher QoS, (e.g., URLLC).

FIG. 8B illustrates a non-overlapping scenario where, if the duration D (represented by arrows) in time between the physical channels from both cells is large enough for switching between cells by the UE 120a (i.e., a configured threshold), then the UE 120a may switch between the first cell and the second cell to receive both of the first signal and the second signal. However, in an example where the duration between the physical channels from both cells is not large enough for switching between cells, the UE 120a may determine which one of the one or more first communication metrics and the one or more second communication metrics has priority over the other.

FIG. 8C illustrates another non-overlapping scenario, where the duration D in time between a physical channel of the target cell and a physical channel of the source cell is not large enough to permit the UE 120a to switch between the first cell and the second cell to receive both of the first signal and the second signal. Thus, in one example, the UE 120a may determine which one of the one or more first communication metrics associated with the physical channel of the target cell and the one or more second communication metrics associated with the physical channel of the source cell has priority over the other.

Accordingly, the UE 120a may be configured to determine a difference in timing between a transmission of the first signal and a transmission of the second signal to determine whether the UE 120a can receive both the first signal and the second signal, or if the UE 120a can only receive one. For example, the UE 120a may determine that a first transmission time of the first signal transmitted by the target BS 110b is less than a threshold time duration from a second transmission time of the second signal transmitted by the source BS 110a. Thus, in this example, the UE 120a can receive only one of the first signal or the second signal.

Based on determining that the first transmission time is less than the threshold time duration from the second transmission time, the UE 120a may determine which one of the one or more first communication metrics and the one or more second communication metrics has priority over the other. If the one or more first communication metrics have priority over the one or more second communication metrics, the UE 120a may determine to receive the first signal using the first receive beam instead of the second signal using the second receive beam. Alternatively, if the one or more second communication metrics have priority over the one or more first communication metrics, the UE 120a may determine to receive the second signal using the second receive beam instead of the first signal using the first receive beam.

In certain aspects, the one or more first communication metrics associated with the first signal, and the one or more second communication metrics associated with the second signal can be ranked by the UE 120a according to a QoS type and/or value. For example, the first signal may be an enhanced mobile broadband (eMBB) signal having a PER requirement of $10^{-3}$ with no PDB, while the second signal may be an ultra-reliable low-latency communication (URLLC) having a PER requirement of $10^{-6}$ and a PDB requirement. In some examples, the UE 120a may rank the first and second communication metrics according to which has the relatively highest latency, reliability, and/or priority requirements. Thus, in determining which one of the one or more first communication metrics and the one or more second communication metrics have priority over the other, the UE 120a may determine which of the one or more first communication metrics and the one or more second communication metrics has a relatively highest ranked communication metric over the other. For example, the UE 120a may determine to receive the second signal associated with the URLLC because the QoS type (e.g., URLLC signal with a PDB requirement ranks higher than the eMBB with no PDB requirement), and the QoS value (e.g., a PER of $10^{-6}$ associated with the URLLC is ranked higher than the PER of $10^{-3}$ associated with the eMBB).

In some examples, the UE 120a may rank the first signal and the second signal based on a hierarchy of QoS types and/or values. For example, the hierarchy of values may start with a QoS metric such as PER. Accordingly, the UE 120a may compare the PER requirement of the first signal with the second signal to determine which has a highest priority. If the first signal and the second signal have different PER requirements, then the UE 120a may select the signal having the lower PER requirement. However, if both the first signal and the second signal have the same PER, then the UE 120a may consider the next QoS metric in the hierarchy; for example, PDB. For example, if only one signal has a PDB, then the UE 120a may select to receive that signal. However, if both the first signal and the second signal have the same PDB, then the UE 120a may consider the next QoS metric in the hierarchy. Accordingly, the UE 120a may continue to rank each of the first signal and the second signal according to a hierarchy of QoS types and/or values until the UE 120a determines which signal has the higher priority. At that point, the UE 120a will determine to receive that signal.

In some examples, each of the first communication metric and the second communication metric are associated with different time durations within a time period. In some examples, the time period may relate to the start of the MBB handover to its completion. For example, the time period may relate to a duration where the UE 120a can communicate (transmit and receive) over both the first cell connection and the second cell connection during the handover. Thus, within that time period, there may be one or more contiguous time durations that are associated with a different QoS metric.

Figure 9:
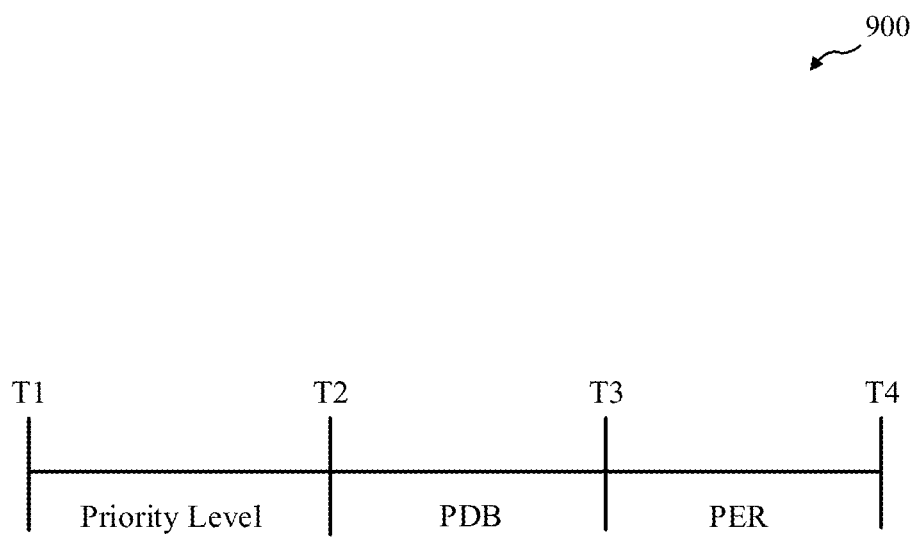
FIG. 9 is a diagram illustrating an example of contiguous time durations, in accordance with certain aspects of the present disclosure.

For example, FIG. 9 is a diagram 900 illustrating an example of contiguous time durations (e.g., T1-T2, T2-T3, and T3-T4) associated with different communication metrics (e.g., QoS metrics) throughout the duration of time that the UE 120a can communicate over both the first cell connection and the second cell connection during an MBB handover.

In this example, the period of time between T1 and T4 may relate to the period of time where the UE 120a can communicate over both the first cell connection and the second cell connection. Each of the contiguous durations of time within the period of time may correspond to one or more communication metrics (e.g., QoS metrics). Thus, if signaling is transmitted to the UE 120a via both of the first cell connection and the second cell connection, the UE 120a may determine to receive one of a first signal from the first cell or a second signal for the second cell based on which of the first signal and the second signal has the highest priority based on the communication metric(s) associated with the applicable time duration (e.g., T1-T2, T2-T3, and T3-T4).

For example, a first time duration (e.g., T1-T2) may be associated with a priority level of a signal transmitted to the UE 120a. Thus, if a first signal is transmitted to the UE 120a via the first cell connection, and a second signal is transmitted to the UE 120a via the second cell connection during the first time duration, the UE 120a may compare the priority of the first signal to the priority of the second signal to determine which has the highest priority. In one example, the first signal may be an eMBB signal with a low priority relative to the second signal (e.g., a URLLC signal). Thus, the UE 120a may determine to receive the second signal via a second receive beam instead of the first signal via a first receive beam.

In another example, a second time duration (e.g., T2-T3) may be associated with a PDB metric of a signal. Thus, if the first signal is transmitted to the UE 120a via the first cell connection, and the second signal is transmitted to the UE 120a via the second cell connection during the second time duration, the UE 120a may compare a PDB of the first signal to a PDB of the second signal to determine which signal has a PDB, and if both signals have a PDB, which signal has the lowest PDB. Thus, the UE 120a may determine to receive the signal having the lowest PDB instead of the other signal.

In another example, a third time duration (e.g., T3-T4) may be associated with a PER metric of a signal. Thus, if the first signal is transmitted to the UE 120a via the first cell connection, and the second signal is transmitted to the UE 120a via the second cell connection during the third time duration, the UE 120a may compare a PER of the first signal to a PER of the second signal to determine which signal has a PER, and if both signals have a PER, which signal has the lowest PDB. Thus, the UE 120a may determine to receive the signal having the lowest PDB instead of the other signal.

Accordingly, in some examples, when the UE 120a determines which one of the one or more first communication metrics and the one or more second communication metrics have priority over the other, the UE 120a may also determine a first communication metric of the one or more first communication metrics associated with the first transmission time, and a second communication metric of the one or more second communication metrics associated with the second transmission time. The UE 120a may then determine which one of the first communication metric and the second communication metric has priority over the other.

Figure 10:
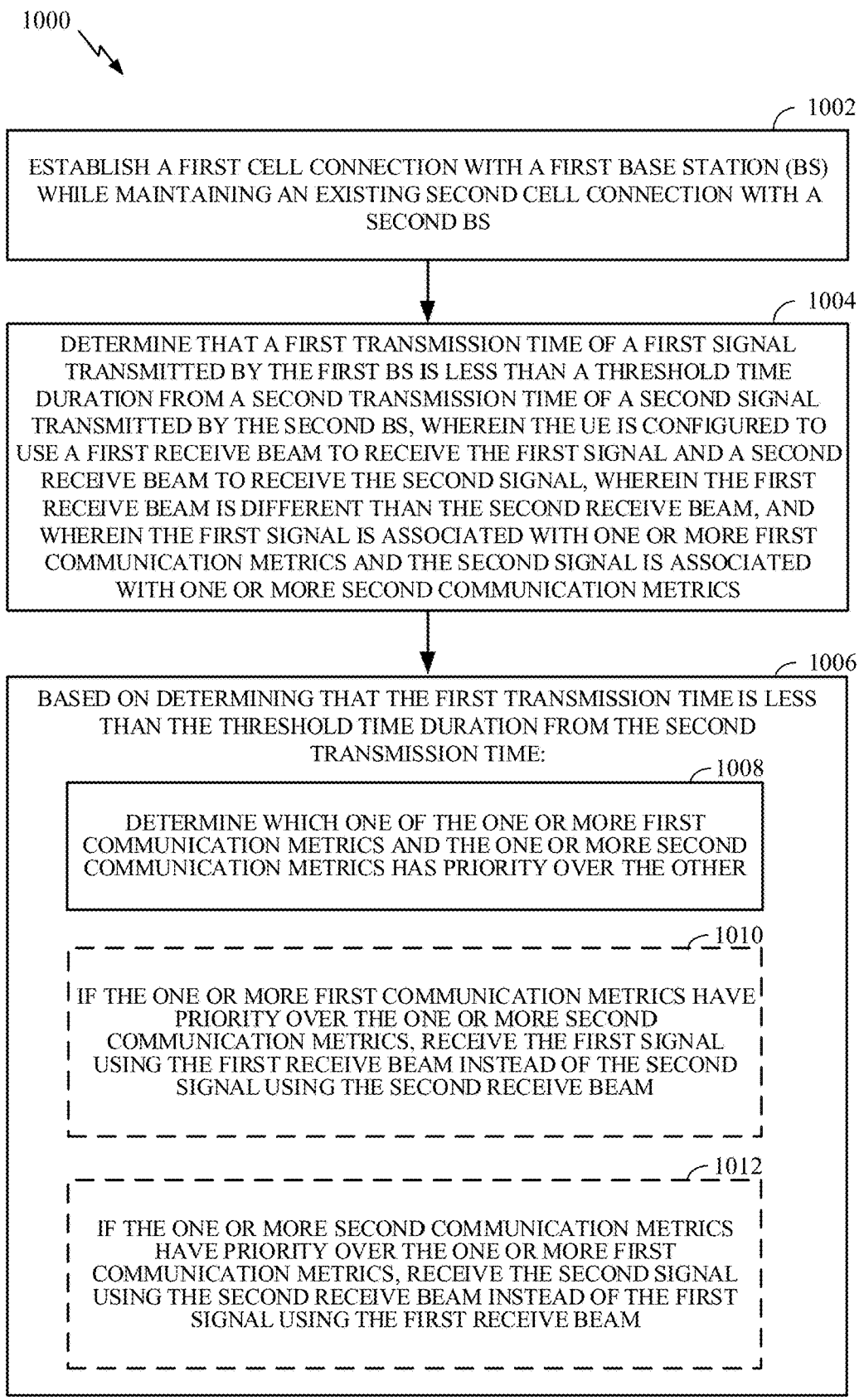
FIG. 10 is a flow diagram illustrating example operations for wireless communication by a UE, in accordance with certain aspects of the present disclosure.

FIG. 10 is a flow diagram illustrating example operations 1000 for wireless communication, in accordance with certain aspects of the present disclosure. The operations 1000 may be performed, for example, by UE (e.g., such as a UE 120a in the wireless communication network 100). Operations 1000 may be implemented as software components that are executed and run on one or more processors (e.g., controller/processor 480 of FIG. 4). Further, the transmission and reception of signals by the UE 120a in operations 1000 may be enabled, for example, by one or more antennas (e.g., antennas 452 of FIG. 4). In certain aspects, the transmission and/or reception of signals by the UE 120a may be implemented via a bus interface of one or more processors (e.g., controller/processor 480) obtaining and/or outputting signals.

The operations 1000 may begin, at a first step 1002, by establishing a first cell connection with a first base station (BS) while maintaining an existing second cell connection with a second BS 110a. In some examples, the first BS is one of a target BS or a source BS, while the second BS is the other of the target BS or the source BS.

The operations 1000 may proceed to a second step 1004, by determining that a first transmission time of a first signal transmitted by the first BS 110b is less than a threshold time duration from a second transmission time of a second signal transmitted by the second BS 110a, wherein the UE 120a is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics.

The operations 1000 may proceed to a third step 1006, wherein, based on determining that the first transmission time is less than the threshold time duration from the second transmission time, the operations 1000 may proceed to a first sub-step 1008 by determining which one of the one or more first communication metrics and the one or more second communication metrics has priority over the other. The operations 1000 may then proceed to one of a second sub-step 1010 or a third sub-step 1012, where, if the one or more first communication metrics have priority over the one or more second communication metrics, the operations 1000 proceed by receiving the first signal using the first receive beam instead of the second signal using the second receive beam. Alternatively, if the one or more second communication metrics have priority over the one or more first communication metrics, the operations 1000 proceed by receiving the second signal using the second receive beam instead of the first signal using the first receive beam.

In certain aspects, each of the one or more first communication metrics and the one or more second communication metrics comprise one or more quality of service (QoS) metrics, wherein the one or more QoS metrics comprise one or more of: a guaranteed bit rate, a priority level, a packet delay budget, a packet error rate, an averaging window, and a maximum data burst volume.

In certain aspects, the one or more first communication metrics and the one or more second communication metrics are ranked by type, and wherein determining which one of the one or more first communication metrics and the one or more second communication metrics have priority over the other comprises determining which of the one or more first communication metrics and the one or more second communication metrics has a highest ranked communication metric with priority over the other.

In certain aspects, each of the one or more first communication metrics and the one or more second communication metrics are associated with a different time period, and wherein determining which one of the one or more first communication metrics and the one or more second communication metrics have priority over the other comprises determining a first communication metric of the one or more first communication metrics associated with the first transmission time. In certain aspects, determining which one of the one or more first communication metrics and the one or more second communication metrics have priority over the other comprises determining a second communication metric of the one or more second communication metrics associated with the second transmission time. In certain aspects, determining which one of the one or more first communication metrics and the one or more second communication metrics have priority over the other comprises determining which one of the first communication metric and the second communication metric has priority over the other.

In certain aspects, the handover operation comprises a make-before-break (MBB) handover and wherein the first cell connection and the second cell connection are both maintained for a time period during the handover, and wherein each of the different time periods occur during the time period during the handover.

In certain aspects, the first transmission time overlaps with the second transmission time.

In certain aspects, the threshold time duration is a minimum time required by the UE 120a for switching from the first cell connection to the second cell connection.

In certain aspects, switching from the first cell connection to the second cell connection comprises switching from a first transmit beam to a second transmit beam, wherein the first transmit beam is transmitted by one of the second BS 110a or the first BS 110b, and wherein the second transmit beam is transmitted by the other of the second BS 110a or the first BS 110b. In certain aspects, switching from the first cell connection to the second cell connection comprises switching from a first set of radio-frequency (RF) parameters associated with the first cell to a second set of RF parameters associated with the second cell, wherein the RF parameters include one or more of a bandwidth, a transmit power, a channel frequency, or a center frequency.

In certain aspects, the first signal comprises one of a first physical downlink shared channel or a first physical downlink control channel, and wherein the second signal comprises one of a second physical downlink shared channel or a second physical downlink control channel.

Figure 11:
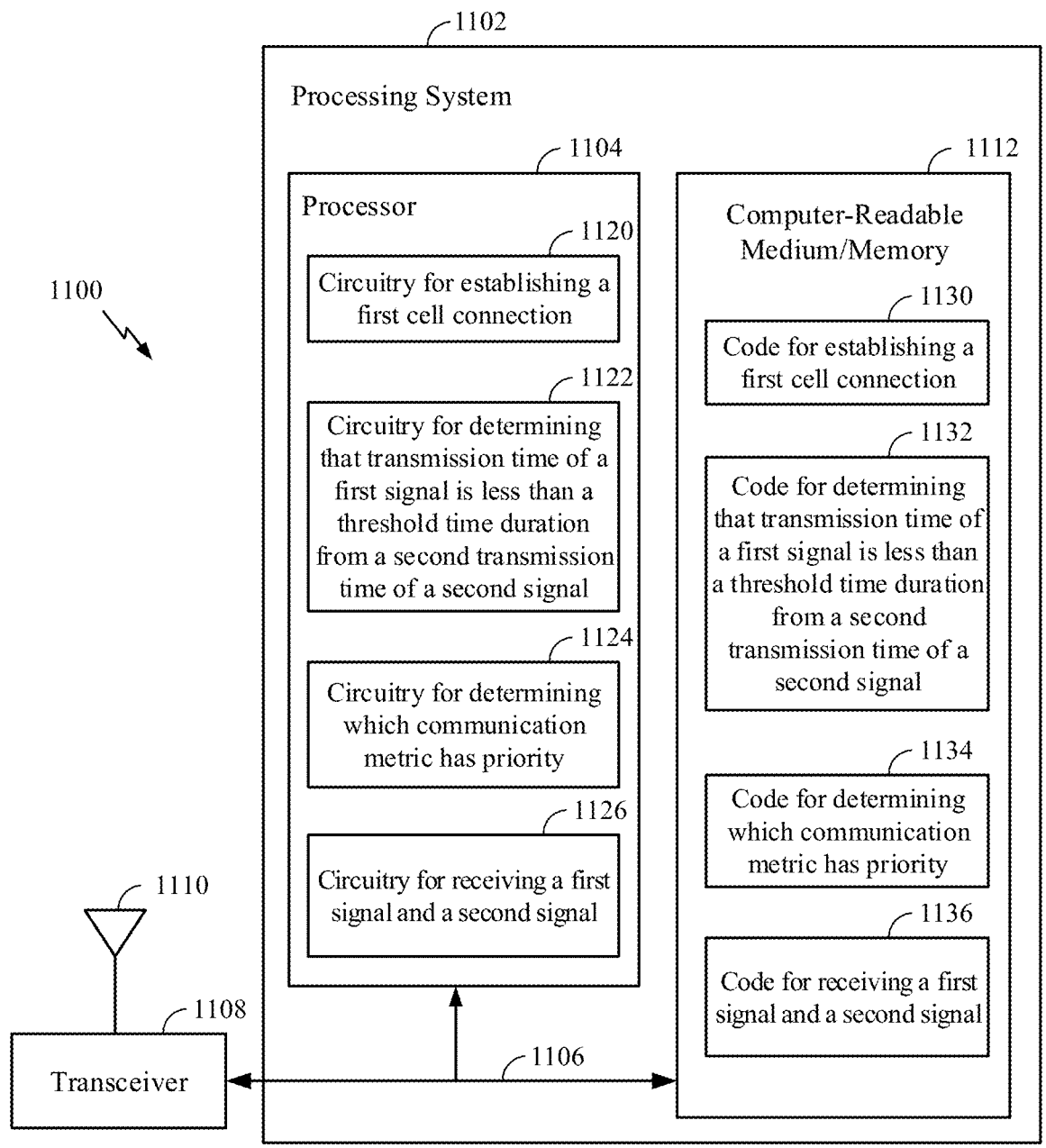
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 10. The communications device 1100 includes a processing system 1102 coupled to a transceiver 1108. The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 10, or other operations for performing the various techniques discussed herein for selecting signaling to receive during MBB handover. In certain aspects, computer-readable medium/memory 1112 stores code 1130 for establishing a first cell connection; code 1132 for determining that transmission time of a first signal is less than a threshold time duration from a second transmission time of a second signal; code 1134 for determining which communication metric has priority; and code 1136 for receiving a first signal and a second signal.

In certain aspects, the processor 1104 has circuitry configured to implement the code stored in the computer-readable medium/memory 1112. The processor 1104 includes circuitry 1120 for establishing a first cell connection; circuitry 1122 for determining that transmission time of a first signal is less than a threshold time duration from a second transmission time of a second signal; circuitry 1124 for determining which communication metric has priority; and circuitry 1126 for receiving a first signal and a second signal.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as NR (e.g., 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. ABS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of performing a handover operation at a user equipment (UE), comprising:
   establishing a first cell connection with a first base station (BS) while maintaining an existing second cell connection with a second BS;
   determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics;
   based on determining that the first transmission time is less than the threshold time duration from the second transmission time:
      determining which one of the one or more first communication metrics and the one or more second communication metrics has priority over the other;
      if the one or more first communication metrics have priority over the one or more second communication metrics, receiving the first signal using the first receive beam instead of the second signal using the second receive beam; and
      if the one or more second communication metrics have priority over the one or more first communication metrics, receiving the second signal using the second receive beam instead of the first signal using the first receive beam.

2. The method of claim 1, wherein each of the one or more first communication metrics and the one or more second communication metrics comprise one or more quality of service (QoS) metrics, wherein the one or more QoS metrics comprise one or more of:
   a guaranteed bit rate;
   a priority level;
   a packet delay budget;
   a packet error rate;
   an averaging window; and
   a maximum data burst volume.

3. The method of claim 1, wherein the one or more first communication metrics and the one or more second communication metrics are ranked by type, and wherein determining which one of the one or more first communication metrics and the one or more second communication metrics have priority over the other comprises:
   determining which of the one or more first communication metrics and the one or more second communication metrics has a highest ranked communication metric with priority over the other.

4. The method of claim 1, wherein each of the one or more first communication metrics and the one or more second communication metrics are associated with a different time period, and wherein determining which one of the one or more first communication metrics and the one or more second communication metrics have priority over the other comprises:
   determining a first communication metric of the one or more first communication metrics associated with the first transmission time;
   determining a second communication metric of the one or more second communication metrics associated with the second transmission time; and
   determining which one of the first communication metric and the second communication metric has priority over the other.

5. The method of claim 4, wherein the handover operation comprises a make-before-break (MBB) handover and wherein the first cell connection and the second cell connection are both maintained for a time period during the handover, and wherein each of the different time periods occur during the time period during the handover.

6. The method of claim 1, wherein the first transmission time overlaps with the second transmission time.

7. The method of claim 1, wherein the threshold time duration is a minimum time required by the UE for switching from the first cell connection to the second cell connection.

8. The method of claim 7, wherein switching from the first cell connection to the second cell connection comprises:
   switching from a first transmit beam to a second transmit beam, wherein the first transmit beam is transmitted by one of the second BS or the first BS, and wherein the second transmit beam is transmitted by the other of the second BS or the first BS; and
   switching from a first set of radio-frequency (RF) parameters associated with the first cell to a second set of RF parameters associated with the second cell, wherein the RF parameters include one or more of a bandwidth, a transmit power, a channel frequency, or a center frequency.

9. The method of claim 1, wherein the first signal comprises one of a first physical downlink shared channel or a first physical downlink control channel, and wherein the second signal comprises one of a second physical downlink shared channel or a second physical downlink control channel.

10. A user equipment (UE) configured to perform a handover operation, the UE comprising:
   a memory; and
   a processor communicatively coupled to the memory, wherein the processor is configured to:
      establish a first cell connection with a first base station (BS) while maintaining an existing second cell connection with a second BS;
      determine that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics;
      based on determining that the first transmission time is less than the threshold time duration from the second transmission time, the processor is further configured to:
         determine which one of the one or more first communication metrics and the one or more second communication metrics has priority over the other;
         if the one or more first communication metrics have priority over the one or more second communication metrics, receive the first signal using the first receive beam instead of the second signal using the second receive beam; and
         if the one or more second communication metrics have priority over the one or more first communication metrics, receive the second signal using the second receive beam instead of the first signal using the first receive beam.

11. The UE of claim 10, wherein each of the one or more first communication metrics and the one or more second communication metrics comprise one or more quality of service (QoS) metrics, wherein the one or more QoS metrics comprise one or more of:
   a guaranteed bit rate;
   a priority level;
   a packet delay budget;
   a packet error rate;
   an averaging window; and
   a maximum data burst volume.

12. The UE of claim 10, wherein the one or more first communication metrics and the one or more second communication metrics are ranked by type, and wherein the processor, being configured to determine which one of the one or more first communication metrics and the one or more second communication metrics have priority over the other, is further configured to:
   determine which of the one or more first communication metrics and the one or more second communication metrics has a highest ranked communication metric with priority over the other.

13. The UE of claim 10, wherein each of the one or more first communication metrics and the one or more second communication metrics are associated with a different time period, and wherein the processor, being configured to determine which one of the one or more first communication metrics and the one or more second communication metrics have priority over the other, is further configure to:
   determine a first communication metric of the one or more first communication metrics associated with the first transmission time;
   determine a second communication metric of the one or more second communication metrics associated with the second transmission time; and
   determine which one of the first communication metric and the second communication metric has priority over the other.

14. The UE of claim 13, wherein the handover operation comprises a make-before-break (MBB) handover and wherein the first cell connection and the second cell connection are both maintained for a time period during the handover, and wherein each of the different time periods occur during the time period during the handover.

15. The UE of claim 10, wherein the first transmission time overlaps with the second transmission time.

16. The UE of claim 10, wherein the threshold time duration is a minimum time required by the UE for switching from the first cell connection to the second cell connection.

17. The UE of claim 16, wherein the processor, being configured to switch from the first cell connection to the second cell connection, is further configured to:
   switch from a first transmit beam to a second transmit beam, wherein the first transmit beam is transmitted by one of the second BS or the first BS, and wherein the second transmit beam is transmitted by the other of the second BS or the first BS; and
   switch from a first set of radio-frequency (RF) parameters associated with the first cell to a second set of RF parameters associated with the second cell, wherein the RF parameters include one or more of a bandwidth, a transmit power, a channel frequency, or a center frequency.

18. The UE of claim 10, wherein the first signal comprises one of a first physical downlink shared channel or a first physical downlink control channel, and wherein the second signal comprises one of a second physical downlink shared channel or a second physical downlink control channel.

19. A user equipment (UE) configured to perform a handover operation, the UE comprising:
   means for establishing a first cell connection with a first base station (BS) while maintaining an existing second cell connection with a second BS;
   means for determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics;

based on a determination that the first transmission time is less than the threshold time duration from the second transmission time:
    means for determining which one of the one or more first communication metrics and the one or more second communication metrics has priority over the other;
    if the one or more first communication metrics have priority over the one or more second communication metrics, means for receiving the first signal using the first receive beam instead of the second signal using the second receive beam; and
    if the one or more second communication metrics have priority over the one or more first communication metrics, means for receiving the second signal using the second receive beam instead of the first signal using the first receive beam.

20. The UE of claim 19, wherein each of the one or more first communication metrics and the one or more second communication metrics comprise one or more quality of service (QoS) metrics, wherein the one or more QoS metrics comprise one or more of:
    a guaranteed bit rate;
    a priority level;
    a packet delay budget;
    a packet error rate;
    an averaging window; and
    a maximum data burst volume.

21. The UE of claim 19, wherein the one or more first communication metrics and the one or more second communication metrics are ranked by type, and wherein the means for determining which one of the one or more first communication metrics and the one or more second communication metrics have priority over the other comprises:
    means for determining which of the one or more first communication metrics and the one or more second communication metrics has a highest ranked communication metric with priority over the other.

22. The UE of claim 19, wherein each of the one or more first communication metrics and the one or more second communication metrics are associated with a different time period, and wherein the means for determining which one of the one or more first communication metrics and the one or more second communication metrics have priority over the other comprises:
    means for determining a first communication metric of the one or more first communication metrics associated with the first transmission time;
    means for determining a second communication metric of the one or more second communication metrics associated with the second transmission time; and
    means for determining which one of the first communication metric and the second communication metric has priority over the other.

23. The UE of claim 22, wherein the handover operation comprises a make-before-break (MBB) handover and wherein the first cell connection and the second cell connection are both maintained for a time period during the handover, and wherein each of the different time periods occur during the time period during the handover.

24. The UE of claim 19, wherein the first transmission time overlaps with the second transmission time.

25. The UE of claim 19, wherein the threshold time duration is a minimum time required by the UE for switching from the first cell connection to the second cell connection.

26. The UE of claim 25, further comprising a means for switching from the first cell connection to the second cell connection comprising:
    means for switching from a first transmit beam to a second transmit beam, wherein the first transmit beam is transmitted by one of the second BS or the first BS, and wherein the second transmit beam is transmitted by the other of the second BS or the first BS; and
    means for switching from a first set of radio-frequency (RF) parameters associated with the first cell to a second set of RF parameters associated with the second cell, wherein the RF parameters include one or more of a bandwidth, a transmit power, a channel frequency, or a center frequency.

27. The UE of claim 19, wherein the first signal comprises one of a first physical downlink shared channel or a first physical downlink control channel, and wherein the second signal comprises one of a second physical downlink shared channel or a second physical downlink control channel.

28. A non-transitory computer-readable storage medium having instructions stored thereon for performing a method of performing a handover operation at a user equipment (UE), the method comprising:
    establishing a first cell connection with a first base station (BS) while maintaining an existing second cell connection with a second BS;
    determining that a first transmission time of a first signal transmitted by the first BS is less than a threshold time duration from a second transmission time of a second signal transmitted by the second BS, wherein the UE is configured to use a first receive beam to receive the first signal and a second receive beam to receive the second signal, wherein the first receive beam is different than the second receive beam, and wherein the first signal is associated with one or more first communication metrics and the second signal is associated with one or more second communication metrics;
    based on determining that the first transmission time is less than the threshold time duration from the second transmission time:
        determining which one of the one or more first communication metrics and the one or more second communication metrics has priority over the other;
        if the one or more first communication metrics have priority over the one or more second communication metrics, receiving the first signal using the first receive beam instead of the second signal using the second receive beam; and
        if the one or more second communication metrics have priority over the one or more first communication metrics, receiving the second signal using the second receive beam instead of the first signal using the first receive beam.

29. The non-transitory computer-readable storage medium of claim 28, wherein each of the one or more first communication metrics and the one or more second communication metrics comprise one or more quality of service (QoS) metrics, wherein the one or more QoS metrics comprise one or more of:
- a guaranteed bit rate;
- a priority level;
- a packet delay budget;
- a packet error rate;
- an averaging window; and
- a maximum data burst volume.

30. The non-transitory computer-readable storage medium of claim 28, wherein the one or more first communication metrics and the one or more second communication metrics are ranked by type, and wherein determining which one of the one or more first communication metrics and the one or more second communication metrics have priority over the other comprises:
- determining which of the one or more first communication metrics and the one or more second communication metrics has a highest ranked communication metric with priority over the other.

* * * * *